Jan. 30, 1968     M. FEINBERG     3,366,128
TEMPERATURE AND PRESSURE RESPONSIVE RELIEF VALVE
Filed June 15, 1965

INVENTOR
MAURICE FEINBERG

BY Bartholomew Diggins

ATTORNEY

United States Patent Office 3,366,128
Patented Jan. 30, 1968

3,366,128
TEMPERATURE AND PRESSURE RESPONSIVE
RELIEF VALVE
Maurice Feinberg, 2 Jackson St., Waltham, Mass. 02154
Filed June 15, 1965, Ser. No. 464,159
6 Claims. (Cl. 137—73)

ABSTRACT OF THE DISCLOSURE

The relief valve includes an inlet port and an outlet port to an internal valve chamber which constitute the only access openings for internal valve components. A valve and valve seat assembly may be inserted into the valve chamber through at least one of the ports and the valve seat assembly is movable relative to the relief valve housing to preset the bias of a valve biasing spring.

---

This invention relates to relief valves generally and more particularly to an improved relief valve of simple design adapted to effectively provide accurate control for a variety of fluid systems.

Temperature and pressure relief valves are widely employed in industry and have been manufactured for many years in a variety of sizes and shapes, but invariably these relief valves have been constructed in accordance with a common body design which previously has been used for substantially all valves of this type. Basically, this body design includes a valve housing provided with a minimum of three external orifices which provide openings into the valve chamber within the housing. Conventionally, two of these orifices provide an inlet to permit fluid to enter the valve chamber and an outlet to allow fluid to flow outwardly from the valve chamber when the valve opens to relieve either excessive temperature or pressure. The third opening in the valve housing is formed to provide a means of access to the temperature and pressure sensing and control elements mounted within the valve housing.

Although only two external openings, the fluid inlet and outlet, in the valve housing are essential to the operation of a relief valve, the third or assembly opening, while not essential to the proper functioning of the valve, has been required to facilitate valve assembly and the setting of the pressure and temperature valve control units. This assembly or access opening not only increases the machining operation required to form the relief valve housing, but additionally this opening must be closed when the relief valve is assembled and set for pressure and temperature. Normally this closure is accomplished by employing a cap or seal in conjunction with a sealing washer to prevent the leakage of fluid and to prevent tampering with the relief valve settings.

In conventional relief valves many internal valve components and structural elements are required to achieve effective valve operation. These include, in addition to the cap and seal for the assembly opening, pressure and temperature adjusting screws and a mounting saddle or crossbar to support a thermal control element. These elements not only increase appreciably the cost involved in the manufacture and assembly of relief valves, but additionally these components contribute to valve malfunction. For example, the assembly opening with the corresponding seal and cap therefor presents a potentially hazardous leakage point while the saddle or crossbar support provides pockets in which oxides, lime deposits or other foreign materials may collect to ultimately obstruct the internal pressure chamber below the valve seating orifice. The provision of separate pressure and temperature adjusting screws or equivalent components to perform a similar adjusting function increases the possibility for leakage, malfunction, or subsequent tampering with relief valve settings, and additionally, these added control components must be preset and tested after valve assembly, thereby increasing the complexity of the valve manufacturing process.

The aforementioned difficulties experienced with existing relief valves have led to a need for the development of a simple but effective relief valve which may be economically constructed and assembled but which is capable of providing prolonged trouble free operation.

It is a primary object of this invention to provide a novel and improved relief valve having a valve housing provided with only a fluid inlet and a fluid outlet opening communicating with an internal valve chamber.

Another object of this invention is to provide a novel and improved relief valve incorporating a unique valve seat structure which eliminates the need for superfluous assembly openings in the valve housing.

A further object of this invention is to provide a novel and improved relief valve incorporating a unique valve seat structure to facilitate setting of the valve control elements by valve assembly.

Another object of this invention is to provide a novel and improved relief valve incorporating a unique valve seat structure to facilitate pressure control adjustment during valve assembly.

A further object of this invention is to provide a novel and improved pressure and temperature relief valve incorporating a unique valve seat structure which forms a combination valve seat, pressure adjusting device and thermal control element positioner.

A still further object of this invention is to provide a novel and improved relief valve which may be economically manufactured with a minimum of machining, assembling and testing.

With the foregoing and other objects in view, the invention resides in the following specification and appended claims, certain embodiments and details of construction of which are illustrated in the accompanying drawings in which:

In the novel relief valve of the present invention, the employment of a unique valve seat construction in conjunction with a novel relief valve housing structure results in the elimination of the assembly opening formed in the valve housing of conventional relief valves and also in the elimination of components previously included for setting the valve control means. Additionally this valve seat construction permits the relief valve control parameters to be preset by valve assembly rather than as a separate post-assembly operation.

Figure 1:
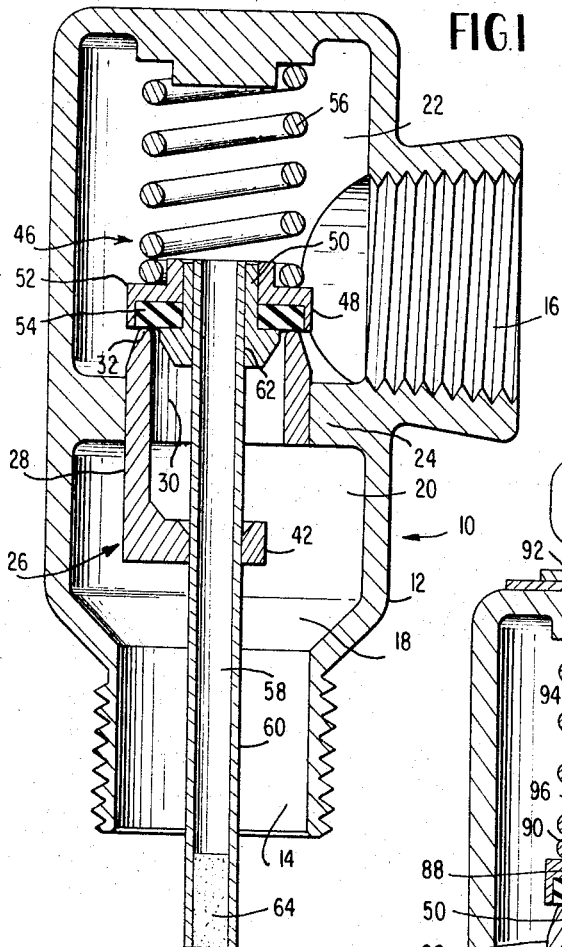
FIGURE 1 is a vertical cross sectional view of the relief valve of the present invention.
Figure 2:
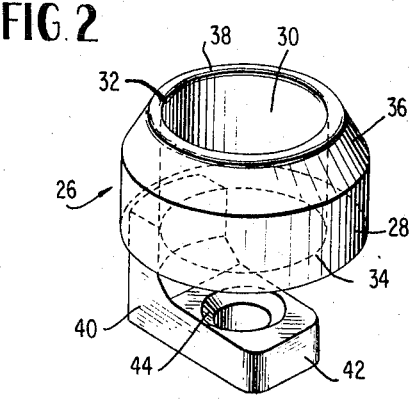
FIGURE 2 is a perspective view of the valve seat assembly of the relief valve of FIGURE 1.

The relief valve of the present invention may best be understood with reference to FIGURES 1 and 2 wherein the relief valve indicated generally at 10 includes a rigid housing 12 of cast metal or similar material. The housing 12 is provided with a fluid inlet port 14 and a fluid outlet port 16 which provide the only external openings in the housing 12 communicating with an internal valve chamber 18. This internal valve chamber is divided into a lower section 20 and an upper section 22 by an annular ridge or valve seat support 24 which projects into the internal valve chamber 18 and which is formed on the valve housing beneath the fluid outlet port by casting or machining. As will be noted from FIGURE 1, the fluid outlet port 16 communicates with the upper section 22 of the internal valve chamber while the fluid inlet port 14 communicates with the lower section 20. It is important to note that except for the fluid inlet port 14 and the fluid outlet port 16, the lower and upper sections of the internal valve chamber 18 are completely enclosed by the housing 12 and no additional external openings are formed therein.

The annular valve seat support 24 is designed to receive a circular valve seat assembly indicated generally at 26. It is this unique valve seat asssembly which permits the elimination of superfluous assembly openings in the valve housing 12 and which also eliminates the multiplicity of control components previously employed in conventional relief valves.

Referring particularly to FIGURE 2, the valve seat assembly 26 of the present invention includes a cylindrical body 28 defining an inner chamber 30 which terminates in upper and lower circular openings 32 and 34. The outer surface of the body 28 adjacent the upper opening 32 is tapered inwardly, as indicated at 36, to form a smooth, rounded valve seat surface 38 about the periphery of the upper opening 32.

Extending below the cylindrical valve seat body 28 as an integral extension thereof, is an L-shaped support element 40 having a support arm 42 which extends substantially perpendicular to the central axis of the chamber 30. Extending through the support arm 42 is a circular aperture 44 which is positioned so that the central axis thereof is coextensive with the central axis of the valve seat chamber 30.

In FIGURE 1, it will be noted that the valve seat assembly 26 is mounted in the relief valve housing 12 by inserting the valve seat assembly into the central support aperture formed by the valve seat support 24. The valve seat assembly may be press fit to the valve seat support 24 or may be maintained in position relative to the valve seat support by other known means such as threads, etc. As the valve seat assembly is longer than the inner diameter of either of the fluid ports 14 or 16, it is imperative that the outer diameter of the cylindrical body 28 of the valve seat assembly 26 be less than the inner diameter of the fluid inlet port 14, so that the valve seat assembly may be easily inserted through the fluid inlet port 14 into position within the valve housing 12. The valve seat assembly may therefore be positioned within the relief valve 10 without requiring a separate assembly aperture in the relief valve housing.

In assembling the relief valve 10, a valve control assembly 46 is positioned within the upper section 22 of the valve chamber 18 prior to the insertion of the valve seat assembly into the housing 12. This valve control assembly includes a circular control valve 48 having an outer diameter which is smaller than the inner diameter of at least one of the fluid ports 14 or 15. This control valve is designed to seat against the valve seat surface 38 of the valve seat assembly 26. The control valve 48 incldes a body 50 which supports a washer holder 52 for a circular, resilient washer 54. When the control valve 48 is in position within a completely assembled relief valve 10, the resilient washer 54 seats against the valve seat surface 38 of the valve seat assembly.

The control valve 48 is biased toward the valve seat assembly by a pressure control spring 56 which extends through the upper section 22 of the valve chamber 18 between the control valve and the valve housing 12. This pressure control spring operates in conjunction with the valve seat assembly 26 to control the pressure parameters of the relief valve 10.

It is generally desirable to render the relief valve responsive to both temperature and pressure, and therefore the temperature parameters of the relief valve can be controlled by a temperature sensing control element 58. Control element 58 is formed by an elongated hollow tube 60 which extends through the central aperture 44 in the support portion 40 of the valve seat assembly 26. The tube 60 extends upwardly from the support arm 42 and is pressed into a central aperture 62 formed in the control valve body 50. The control element tube is slidable longitudinally with respect to the support arm 42 to permit valve operation in response to fluid pressure.

The lower section of the tube 60 is filled with a heat fusible alloy or substance 64 which melts at a predetermined temperature to permit fluid to flow through the tube 60 and out through the outlet port 16 of the relief valve 10.

The novel construction of the relief valve 10 permits the valve to be rapidly assembled and the predetermined temperature and pressure parameters of the valve are set as a part of the manufacturing or assembly operation. The pressure setting of the valve is accomplished during assembly by positioning the valve seat assembly 26 relative to the valve seat support 24. It will become apparent that the further the valve seat assembly is inserted into the upper section 22 of the valve chamber 18, the more the pressure control spring 56 will be compressed to exert a greater bias upon the control valve 48. Therefore, as the bias of the pressure control spring 56 is varied by the positioning of the valve seat assembly 26, so also is the pressure setting at which the valve 48 will be raised from the valve seat by fluid pressure against the bias of the control spring to permit fluid flow through the relief valve 10.

As previously explained, it is quite obvious that the temperature setting of the relief valve may be controlled by the fusion temperature of the fusible material 64, and various materials may be employed to preset the valve to a desired fusion temperature.

From a consideration of the relief valve 10 of FIGURE 1, it will be apparent that this valve may be easily assembled and preset through the use of the uniquely designed valve seat assembly 26. This valve seat assembly operates as a pressure control element and also as a support to accurately position the thermal control element centrally with respect to the central chamber 30 of the valve seat assembly and the control valve 48. Once the relief valve has been assembled and the temperature and pressure parameters thereof preset, the valve is leak-proof and tamper proof, for with the valve installed in a fluid line, there are no openings in the valve housing 12 to facilitate tampering or leakage.

Obviously, the relief valve 10 may be varied in form and the valve seat assembly 26 may also be varied to adapt the valve seat for use in various valves. For example, the lower section of the valve seat assembly may be U-shaped instead of L-shaped, for all that is required is that sufficient waterway is provided through the valve seat assembly for relief of excessive temperature or pressure.

Figure 4:
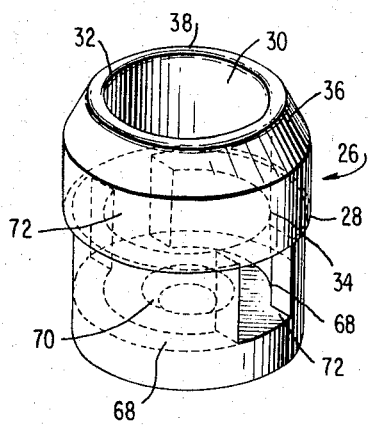
FIGURE 4 is a perspective view of the valve seat assembly of the relief valve of FIGURE 3.
Figure 3:
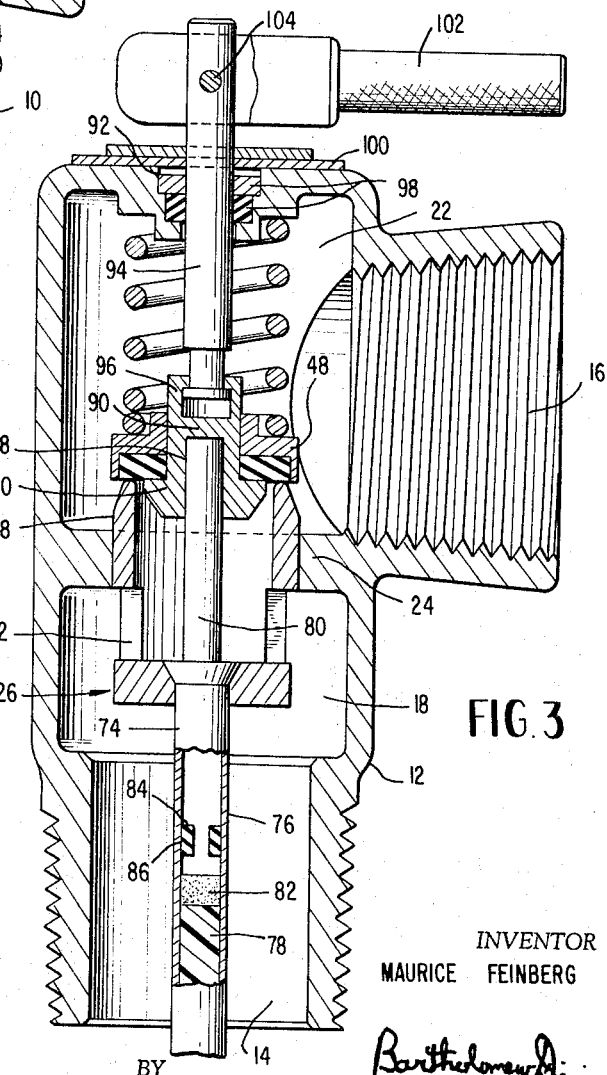
FIGURE 3 is a vertical cross sectional view of an embodiment of the relief valve of the present invention.

A second embodiment of the relief valve of the present invention is illustrated by FIGURES 3 and 4, wherein, for purposes of clarity, like reference numerals will be employed to designate valve components shown by FIGURE 1. As will be noted from FIGURE 4, the valve seat assembly 26 is formed with an integral circular support section 66 extending below the valve seat body 28. Circular support section 66 includes an end support wall 68 with a central aperture 70 formed therethrough. The central aperture 70, like the central aperture 44 of FIGURE 2, is positioned so that the central axis thereof is coextensive with the central axis of the valve seat chamber 30. To permit free fluid flow through the valve seat assembly of FIGURE 4, the circular support section 66 is provided with openings 72 which provides fluid access openings at the periphery of the central chamber of the valve seat assembly 26.

Referring now to FIGURE 3, it will be noted that the valve seat assembly of FIGURE 4 is mounted in the valve housing 12 in the manner previously described with respect to the valve seat assembly of FIGURE 1, and that the valve seat assembly operates to preset the bias of the pressure control spring 56. The valve seat assembly also functions to accurately position and support a temperature control element 74. The temperature control element 74 of FIGURE 3 is substantially the same as that illustrated in my copending application, Ser. No. 313,885 for Thermosensitive Control Device, filed Oct. 4, 1963 and now Pat No. 3,319,467. This control element is formed with an elongated tubular casing 76 adapted to have a thermally responsive plastic rod 78 of thermally responsive inelastic plastic material snugly received within the casing. One end of the casing 76 is open to receive a slidable piston 80 which extends outwardly beyond the casing, while the inner end of the piston is enclosed within the casing and engages an elastomeric sealing disc 82. The sealing disc is positioned between the inner end of the piston and the outer end of the plastic rod 78 and operates as a positive seal against the ingress of liquid into contact with the plastic rod.

It is imperative that no liquid from within the valve chamber 18 be permitted to pass beyond the inner end of the piston 80, for such liquid would upset the temperature response of the temperature control element 74. Therefore, the inner end of the piston 80 is formed within an annular groove 84 which acts as a seat to receive a resilient O-ring 86. This O-ring provides a tight seal between the piston 80 and the inner walls of the cylindrical casing 76.

The casing 76 of the temperature control element 74 is secured within the support aperture 70 in the support wall of the valve seat assembly 26 so that upon expansion of the plastic rod 78, the piston 80 moves outwardly from the casing. The valve seat assembly 26 accurately positions the thermal control element 74 so that the casing 76 extends through the lower section of the valve housing 12 and the inlet port 14 while the piston 80 is centrally located with reference to the chamber 30 of the valve seat housing.

The free end of the piston 80 extends into the lower section 88 of a central opening in the control valve body 50, so that upon expansion of the plastic rod 78, the piston moves outwardly from the casing 76 to raise the control valve 48 away from the valve seating surface 38, thereby permitting fluid to flow through the valve seat assembly 26 and the fluid outlet port 16.

In some instances, it is desirable to provide a test lever with the relief valve 10, as illustrated in FIGURE 3. To facilitate this relief lever, a small stepped hole indicated at 92 is machined through the upper portion of the valve housing 12 to receive an operating spindle 94. The lower end of the operating spindle 94 is connected to the body 50 of the control valve 48, but it is essential that the control valve be free to move upwardly away from the valve seat 38 for a limited distance before engaging the lower end of the operating spindle. Therefore, a divider 90 is provided in the central aperture of the valve body 50 to provide a space 96 between the upper end of the piston 80 and the lower end of the spindle 94. Thus, the piston 80 is permitted to move the valve 48 upwardly away from the valve seat surface 38 for a limited distance before the divider 90 contacts the lower end of the operating spindle 94.

To prevent fluid leakage about the periphery of the spindle 94, O-ring sealing members 98 are seated in the stepped opening 92 and fill the space between this opening and the periphery of the spindle 94. Additionally, a closure plate 100 is secured to the top of the housing 12 and extends across the opening 92.

To actuate the spindle 94 and raise the valve 48 against the bias of the pressure control spring 56, an actuator handle 102 is provided at 104 to the upper end of the spindle. This actuator handle may be piovted upwardly to move the spindle 94 upwardly against the bias of the pressure control spring.

In the assembly and operation of the relief valve 10 of FIGURE 3, the valve seat assembly 26 is positioned within the valve housing 12 as previously described in connection with FIGURE 1 to adjust the bias of the pressure control spring 56 and thereby preset the pressure limit at which the relief valve will operate.

The relationship between the outer end of the piston 80 and the divider 90 within the valve body 50 is fixed by the length of the valve seat assembly 26, as the distance between the valve seat surface 38 and the closure end 68 which supports the casing 76 is constant. This relationship is therefore maintained constant, regardless of the pressure setting of the relief valve which is determined by the positioning of the valve seat assembly 26 within the housing 12.

The presetting of the temperature parameters of the relief valve 10 of FIGURE 3 may be accomplished by controlling the dimensions of the components of the thermal control element 74. For example, a simple way to increase or decrease the temperature setting of the relief valve is to increase or decrease the length of the plastic rod 78 within the casing 76. Increasing the length of the plastic rod brings the upper end of the plastic rod within the casing 76 closer to the lower end of the piston 80, causing the plastic rod to contact the piston shortly after initial expansion of the rod occurs. Thus the piston will be caused to raise the valve 48 away from the valve seating surface 38 at a lower temperature setting. Conversely, to cause the relief valve to operate at a higher temperature, the length of the plastic rod 78 may be decreased to create a greater space between the upper end of the plastic rod and the lower end of the piston 80. This method of temperature control is not only very accurate, but may be easily accomplished during assembly of the thermal elements. Thus the expensive and time consuming procedure of individually temperature setting each relief valve is eliminated, and pressure setting of the relief valve is easily achieved during valve assembly.

It will be readily apparent to those skilled in the art that the present invention provides a novel relief valve which is completely tamper proof and leak proof. The inherent simplicity in design of such relief valve permits the valve to be preset and assembled in one operation and results in the reduction of necessary valve components and the cost of assembling and manufacturing. The arrangement and types of components utilized within this invention may be subject to numerous modifications well within the purview of this inventor who intends only to be limited to a liberal interpretation of the specification in appended claims.

I claim:

1. A relief valve comprising a valve housing defining an internal valve chamber, a fluid inlet port and a fluid outlet port formed in said housing, said inlet and outlet ports constituting the sole external access openings in said housing for valve components within said valve chamber, a valve seat assembly mounted within said valve chamber between said fluid ports having external dimensions smaller than the dimensions of at least one of said fluid ports to permit insertion of said valve seat assembly through a fluid port into said valve chamber, said valve seat assembly including a valve seat body having a fluid flow passage extending therethrough, a valve seat formed adjacent said fluid flow passage at one end of said valve seat body, and support means formed on said valve seat body in spaced relationship to said valve seat, valve closure assembly means mounted within said housing and having external dimensions smaller than the dimensions of at least one of said fluid ports to permit insertion of said valve closure assembly through one fluid port into said valve chamber, said valve closure assembly means including closure means adapted for movement toward and away from engagement with said valve seat to control fluid flow through said valve and means mounted within said housing to bias said closure means toward said valve seat, said valve seat assembly being movable relative to said housing to preset the bias of said biasing means, and an elongated thermal control means mounted within said valve chamber and positioned by said support means to extend centrally through the fluid passage in said valve seat body to contact fluid flowing through said inlet port, said thermal control means including a casing mounted in said support means, said casing having a closed end in communication with fluid flowing into said valve and an open end, a thermally sensitive plastic member expandable at elevated temperatures received in said casing and abutting the closed end thereof, and piston drive means slidably received in said casing and movable outwardly of the open end thereof in response to the expansion of said plastic member, said piston drive means being connected to move said valve closure means away from engagement with said valve seat upon expansion of said plastic member.

2. A relief valve comprising a valve housing defining an internal valve chamber, a fluid inlet port and a fluid outlet port formed in said housing, said inlet and outlet ports constituting the sole external access openings in said housing for valve components within said valve chamber, a valve seat assembly mounted within said valve chamber between said fluid ports having a length which is greater than the diameter of such ports and a width which is smaller than the diameter of at least one of said ports to permit insertion of said valve seat assembly into said valve chamber, said valve seat assembly including a valve seat body having a fluid flow passage extending therethrough, said fluid flow passage constituting the sole conduit for fluid between said inlet and outlet ports, a valve seat formed adjacent said fluid flow passage at one end of said valve seat body, and a support extending from said valve seat body in spaced relationship to said valve seat, a valve closure assembly mounted within said housing and having external dimensions smaller than the dimensions of at least one of said fluid ports to permit insertion thereof into said valve chamber, said valve closure assembly including a valve closure mounted for movement toward and away from engagement with said valve seat to control all fluid flow through the relief valve and a biasing spring mounted between said housing and said valve closure to bias said valve closure toward said valve seat, said valve seat assembly being movable in relation to said housing to preset the bias of said biasing spring, and an elongated thermal control unit mounted within said valve chamber and connected to said valve closure, said thermal control unit being positioned by said support to extend through the fluid passage in said valve seat body.

3. The relief valve of claim 2 wherein said thermal control means includes an enclosed conduit having a first open end opening into said internal valve chamber above said valve closure means whereby said conduit forms a flow passage through said closure means, an end opposite said first open end in communication with fluid flowing into said valve through said inlet port, and a heat fusible material mounted in said conduit to prevent the flow of fluid therethrough, said heat fusible material operating to open said conduit to fluid flow when the fluid entering said valve reaches a predetermined fusion temperature.

4. The relief valve of claim 2 wherein said support means for positioning said thermal control means constitutes an L-shaped support extending below said valve seat body, said support including a lower support arm having an aperture formed therethrough to receive and position said thermal control means, the central axis of said aperture being substantially coextensive with the central axis of the fluid flow passage in said valve seat body.

5. The relief valve of claim 2 wherein said thermal control means includes a casing mounted in said support means, said casing having a closed end in communication with fluid flowing into said valve and an open end, a thermally sensitive plastic member expandable at elevated temperatures received in said casing and abutting the closed end thereof, and piston drive means slidably received in said casing and movable outwardly of the open end thereof in response to the expansion of said plastic member, said piston drive means being connected to move said valve closure away from engagement with said valve seat upon expansion of said plastic member.

6. The relief valve of claim 2 wherein said support means for positioning said thermal control means constitutes a substantially cylindrical support extending below said valve seat body, a plurality of peripheral fluid access openings formed in said support, and a support wall closing the lower end of said cylindrical support, said support wall including a central opening formed therethrough to receive and position said thermal control means, the central axis of said opening being substantially coextensive with the central axis of the fluid flow passage in said valve seat body.

References Cited

UNITED STATES PATENTS

| | | | |
|---|---|---|---|
| 1,464,230 | 8/1923 | Wightman | 137—53.8 |
| 1,999,505 | 4/1935 | Klaas | 137—315 |
| 2,126,897 | 8/1938 | Lamar | 137—315 XR |
| 2,461,982 | 2/1949 | Horne | 236—92 XR |
| 2,598,351 | 5/1952 | Carter | 236—92 XR |
| 3,181,792 | 5/1965 | Chandler | 236—92 |
| 3,194,009 | 7/1965 | Baker | 236—100 XR |

WILLIAM F. O'DEA, *Primary Examiner.*

R. GERARD, *Assistant Examiner.*